United States Patent [19]
Jacobs

[11] Patent Number: 6,134,633
[45] Date of Patent: Oct. 17, 2000

[54] PREFETCH MANAGEMENT IN CACHE MEMORY

[75] Inventor: Eino Jacobs, Belmont, Calif.

[73] Assignee: U.S. Philips Corporation, New York, N.Y.

[21] Appl. No.: 08/961,963

[22] Filed: Oct. 31, 1997

[51] Int. Cl.[7] ................................................. G06F 12/08
[52] U.S. Cl. ........................................ 711/137; 711/204
[58] Field of Search .................................. 711/137, 204, 711/213; 712/207

[56] References Cited

U.S. PATENT DOCUMENTS

| | | | |
|---|---|---|---|
| 5,357,618 | 10/1994 | Mirza et al. ................................. | 711/3 |
| 5,553,254 | 9/1996 | Berstis et al. ............................. | 712/207 |
| 5,649,144 | 7/1997 | Gostin ....................................... | 711/220 |
| 5,778,435 | 7/1998 | Berenbaum et al. ..................... | 711/137 |
| 5,802,562 | 9/1998 | Kahle ........................................ | 711/122 |
| 5,822,616 | 10/1998 | Hirooka .................................... | 710/22 |
| 5,835,947 | 11/1998 | Cherabuddi .............................. | 711/125 |

FOREIGN PATENT DOCUMENTS

| | | | |
|---|---|---|---|
| 00997790 | 1/1984 | European Pat. Off. .......... | G11C 9/06 |
| 0657807A1 | 6/1995 | European Pat. Off. .......... | G06F 9/38 |

OTHER PUBLICATIONS

Tod C. Mowry et al, "Design and Evaluation of a Compiler Algorithm for Prefetching", SIGPLAN Notices, vol. 27, No. 9 p. 62–73, Sep. 1992.

Patterson, "Microprocessors in 2020", Scientific American, pp. 48–51, Sep. 1995.

*Primary Examiner*—Do Hyun Yoo
*Assistant Examiner*—Gary J. Portka
*Attorney, Agent, or Firm*—Tony E. Piotrowski

[57] ABSTRACT

A computer system, a cache memory and a process, supporting prefetch operations and cache access operations so as to store information duplicated from a high level memory for use by a processing device, the processing device issuing addresses, including prefetch addresses and cache access addresses. The cache memory comprises memory resources, and prefetch resources are coupled to the memory resources and to the processing device both for receipt and storage of prefetch addresses from the processing device and for injection management of the received prefetch addresses so as to coordinate prefetch operations with cache access operations. As for the process, the invention comprises the steps of receiving prefetch addresses issued by a processing device; providing for storing, in a prefetch memory, prefetch addresses; and providing for injecting prefetch addresses in a selected order from the prefetch memory for use in fetching, into the cache memory, information associated with the prefetch addresses.

12 Claims, 5 Drawing Sheets

PREFETCH MANAGEMENT IN CACHE MEMORY

BACKGROUND OF THE INVENTION

This invention relates to systems, apparatuses and methods employing and implementing cache memories. More specifically, this invention relates to systems, apparatuses and methods of managing prefetching in cache memory.

Cache memories generally comprise part of a memory system; the memory system in turn typically comprises part of a computing system, such as a personal computer or a TV set-top box. The computing system further comprises a processing device. In the computing system, the memory system stores information which the processing device accesses in read and write operations.

Memory systems generally are structured as a hierarchy. Hierarchical memory systems combine technologies, generally in physically distinct levels, so as to balance among speed, capacity and expense at each level and toward achieving, overall, both acceptable performance and economy. At their lowest level, hierarchical memory systems typically have registers which are integral with the system's processing device, are limited in number, are extremely fast and are disposed physically adjacent to the logic blocks of the processing device (e.g., the arithmetic logic unit); at the same time, the registers are expensive relative to other memory technologies. Hierarchical memory systems also have high level memory: this memory typically includes (i) a main memory, generally comprising volatile memory technology (e.g., random access memory in any of its forms) and (ii) more-permanent storage (e.g., compact disk, floppy, hard, and tape drives).

Interposed between the registers and the high level memory is the cache memory. The cache memory may itself occupy levels, including a first level that is resident as part of the processing device's integrated circuit ("on-chip"), and a second level that is not on-chip but may be inside the processing device's package or otherwise closely coupled to such device. The cache memory generally is implemented, relative to higher levels of memory, using fast technologies. The cache memory's fast technologies typically are buttressed by physically-close coupling to the processing device. These technologies and coupling tend to be relatively expensive on a per-bit basis. However, because the cache memory typically is small in capacity, its overall cost remains acceptable in the computing system.

The cache memory generally is implemented so as to hold the information that the processing device is most likely to seek in the immediate future. In that regard, if the sought information (e.g., data, instructions, or both) is found in the cache memory (a "hit"), the information can be provided at great speed to the device, it being understood that the processing device will first seek access to information via the cache memory. If, however, the information is not found in the cache memory (a "miss"), the processing device accesses the information via one of the next, higher levels of the memory system. These next-level accesses typically engender, relative to a cache hit, increasingly larger delays in the information's availability (the "miss penalty").

In order to hold in cache memory the information that the processing device is likely to seek in the near-term, it is conventional to engineer the cache memory so as to continually update its contents. The update mechanism duplicates the accessed information, e.g. of a cache miss, from the high level memory into the cache memory. Generally, this update mechanism is implemented to load not only the accessed information, but also the information of neighboring memory addresses. Moreover, the update mechanism typically uses this information to replace other information in the cache memory, the replacement comporting with a selected replacement policy. One such policy is to replace information which, as of the update, was the least recently used such information being deemed the least likely to be used in the near-term and, therefore, replaceable.

While updating is directed to information likely to be accessed, another approach is to load information into the cache memory that is known to be subject to near-term access by the processing device. To do so, the processing device issues a prefetch instruction to the cache memory. The instruction's issue is in advance of the processing device's need to access the information referenced by the instruction. In addition, the issue generally is responsive to software such as the programmer's coding or the processing device's operating system or compiler.

Although prefetching arrangements have been proposed, their use has been constrained by various limitations. An exemplary such limitation is the difficulty associated with identifying prefetchable information. Moreover, even where prefetchable information can be identified, the associated prefetching arrangements have tended to allow insufficient time periods for proper prefetching of information prior to the processing device's initiation of an access operation for that information. While this timing insufficiency may be addressed by programming the prefetch instruction's issue long in advance of the access, so programming is undesirable as it can introduce collateral problems. One such collateral problem is the potential to waste cache memory resources during the time period between the loading and the eventual use of the prefetched information, which waste can degrade the cache memory's performance. Another collateral problem is the potential removal of prefetched information due to replacement under the action of a replacement policy.

The timing insufficiency may also be addressed by segmenting prefetching into a series of prefetch instructions. However, using an instruction series also may be undesirable as it too can introduce collateral problems. One collateral problem is the difficulty of achieving optimal temporal spacing between adjacent prefetch instructions: (i) each prefetch instruction should issue so that its prefetch operations do not conflict with operations of the next, adjacent instruction and (ii) adjacent instructions should issue so as to minimize time gaps between the prefetch operations.

Accordingly, it is desirable to provide a cache memory supporting prefetching while overcoming the problems typically associated with such operations.

SUMMARY OF THE INVENTION

A general object of this invention is to support prefetching in cache memories while overcoming the problems typically associated with such operations.

In accordance with these and other objects, the invention comprises, in one aspect, a cache memory supporting prefetch operations and cache access operations so as to store information duplicated from a high level memory for use by a processing device, the processing device issuing addresses, including prefetch addresses and cache access addresses. The cache memory comprises memory resources for storing information and prefetch resources. The prefetch resources are coupled to the memory resources and to the processing device both for receipt and storage of prefetch addresses from the processing device and for injection management of the received prefetch addresses so as to coordinate prefetch operations with cache access operations.

In another aspect, the invention comprises a computing system, the computing system comprising a processing device, a memory system, and prefetch resources. The memory system includes a high level memory and a cache memory, the high level memory providing for storage of information, and the cache memory providing for storage of information duplicated from the high level memory in connection with the prefetch and cache access addresses.

In yet another aspect, the invention comprises a process including the steps of receiving prefetch addresses issued by a processing device; providing for storing, in a prefetch memory, prefetch addresses; and providing for injecting prefetch addresses in a selected order from the prefetch memory for use in fetching, into the cache memory, information associated with the prefetch addresses.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION

The present invention enables management of prefetching, particularly prefetching associated with plural prefetch instructions. In the description that follows, nomenclature and other details are set forth toward providing a thorough understanding of the present invention. However, it is understood by those of ordinary skill in the pertinent art that the certain details are not required in order to practice the present invention. Moreover, well-known elements, devices, process steps and similar information may be omitted from detailed description, such as by being shown in block diagram form, in order to avoid obscuring the present invention. Further, it is understood by those of ordinary skill in the pertinent art that the following detailed description is of certain embodiments of the present invention and is not intended to describe, and does not describe, all embodiments of the present invention. In that regard, as to such descriptions, it is understood by those of ordinary skill in the pertinent art that one or more of any characteristics can be other than as described (or can be omitted entirely in some cases), without departing from the principles of the invention.

Figure 1:
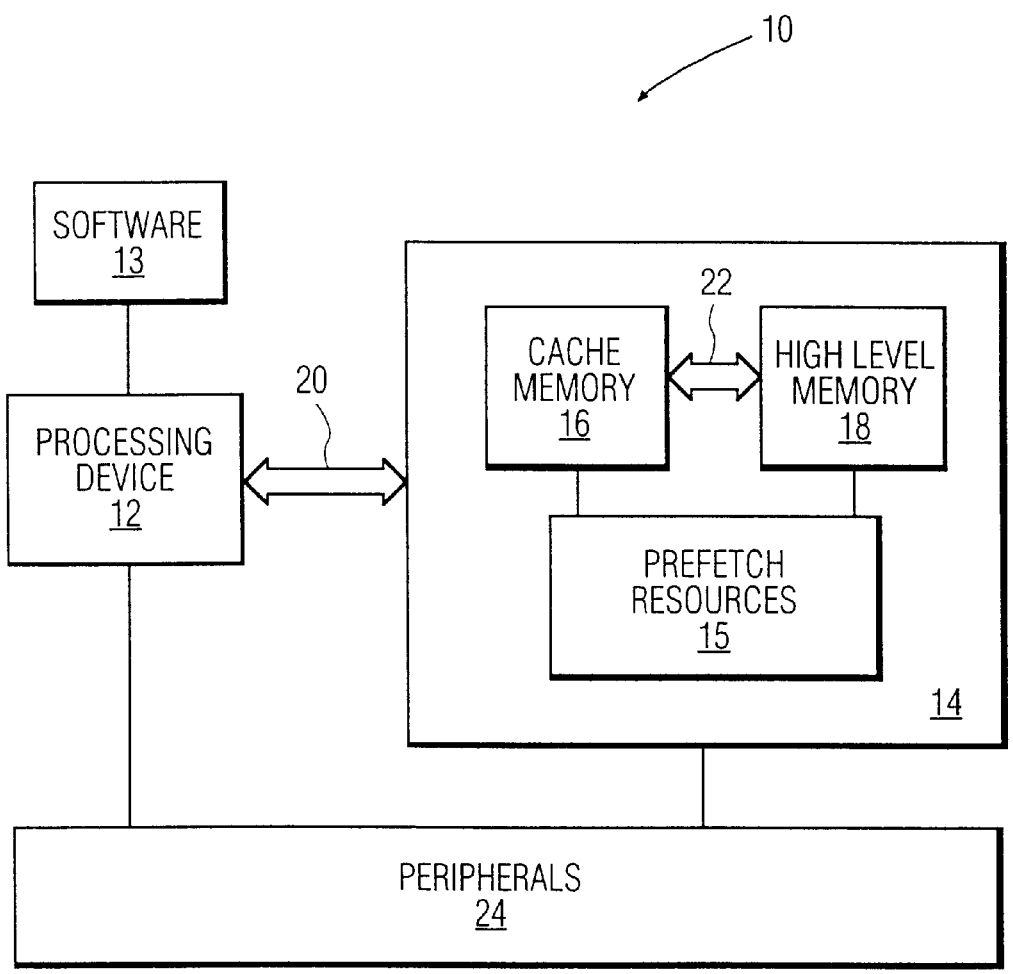
FIG. 1 illustrates a generalized computing system, according to the present invention.

FIG. 1 illustrates a computing system 10, according to the present invention. The computing system 10 includes (i) a processing device 12, (ii) software 13 and (iii) a memory system 14, the memory system comprising prefetch resources 15, cache memory 16 and high level memory 18. The processing device 12 comprises any structure associated with the processing of information. As such, the processing device 12 can comprise, without being exhaustive, a central processing unit (CPU), or a digital signal processor (DSP), or a combination device (DSP/CPU). The processing device can be implemented using a microprocessor, a microcontroller, groups of the same, or otherwise.

The software 13 comprises application programs, compilers and other software tools, operating systems, firmware and other software, as well as combinations thereof, for realizing the operation of the computing system 10, generally, and of the prefetch technology hereof, specifically. As an example, preferably an operating system or other memory management software provides for coherency between the cache memory 16 and the high level memory 18. As another example, preferably the software 13 provides for loading instructions and data into the high level memory 18.

The high level memory 18 comprises, in the aggregate, the memory structures of the computing system 10 other than the cache memory 16. The high level memory 18 includes, for example, main memory and more permanent storage, as well as other caching structures interposed between the cache memory 16 and the main memory. The high level memory 18 typically is not resident in the processing device's integrated circuit or packaging. It is to be recognized, however, that portions (and in some cases, all) high level memory 18 may be integrated with the processing device 12, in accordance with the engineering demands of the computing system 10. In any case, preferably high level memory 18 is provided in some form so that, relative to the cache memory 16, a memory level exists that is less closely coupled to the processing device 12 and that stores information for duplication in the cache memory 16.

The cache memory 16 typically resides in the processing device's integrated circuit or packaging, but may be otherwise disposed without departing from the principles of this invention. In any case (and subject to modified cache blocks in a copy-back configured cache memory), the cache memory 16 contains copies of information stored in the high level memory 18. It is to be recognized that one or more levels of memory can be interposed between the cache memory 16 and the processing device 12. In that regard, the cache memory 16 is generally identified by the structure and functions set forth herein, rather than be labels used in any actual system, apparatus or method.

To read and write information, the memory system 14 is coupled to the processing device 12 via a processing bus 20, and the cache memory 16 is coupled to the high level memory 18 via a memory bus 22. Each of the buses 20, 22 provides for communication of any or all of addresses, information and control signals among the coupled components. Notwithstanding the illustrated couplings, it is to be recognized that other connections, including interposed structures can be used, without departing from the principles of the invention.

The computing system 10 generally also comprises peripherals 24. Although any one or more peripherals may be provided or omitted, in any combination, without departing from the principles of the invention, the peripherals 24 typically comprise various I/O devices, including displays, keyboards, pointing devices, printers and other data acquisition and signal output devices.

Figure 2:
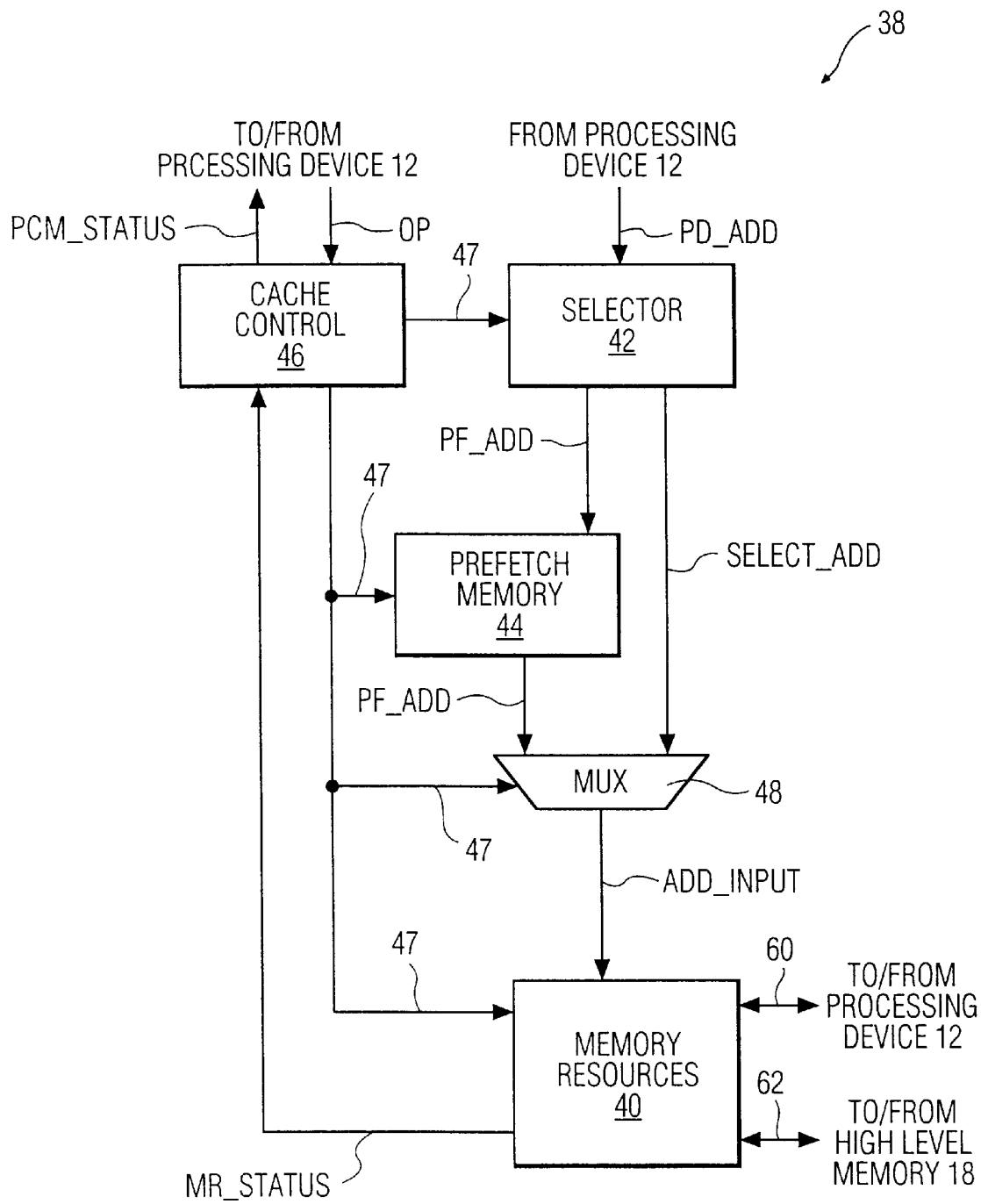
FIG. 2 illustrates a prefetching cache memory, accordingly to the present invention.

FIG. 2 illustrates an embodiment of integrated prefetch resources 15 and cache memory 16, accordingly to the present invention. This embodiment, sometimes referred to herein as prefetching cache memory 38, comprises memory resources 40, selector 42, prefetch memory 44, cache control 46 and multiplexor 48. The cache control 46 is coupled to the processing device 12 and to the memory resources 40 and receives from these structures, respectively, OP and MR_STATUS signals. The OP signal, among other things, directs the cache control 46 as to whether other signals directed to the prefetching cache memory 38 from the processing device 12 are associated with (i) prefetch operations (e.g., prefetch of information into the memory resources 40) or (ii) other operations, including cache access operations (e.g., seeking access to information that may be present in the memory resources 40). The MR_STATUS signal indicates to the cache control 46, among other things, whether particular information is present in the memory resources 40 and whether the memory resources 40 are available for prefetching. Responsive to the OP and MR_STATUS signals, the cache control 46, via control lines 47, controls the operations of the selector 42, the prefetch memory 44, the multiplexor 48 and the memory resources 40. The cache control 46 also generates a PCM_STATUS signal, which signal is provided to the processing device 12 to indicate the status of the prefetching cache memory 38, e.g., as to cache access and prefetch operations.

The selector 42 is coupled to the processing device 12 to receive, and preferably latch, an address signal—PD_ADD. The selector 42 also is coupled to each of the prefetch memory 44 and the memory resources 40 (as to the latter, via the multiplexor 48). In the event that a particular PD_ADD signal is associated with a cache access operation, the selector 42 directs the PD_ADD signal to the memory resources 40 (i.e., to the multiplexor 48 as the SELECT_ADD signal). In the event that the PD_ADD signal is associated with a prefetch operation, the selector 42 directs the PD_ADD signal to the prefetch memory 44, as the PF_ADD signal. In both cases, the direction is controlled by the cache control 46, responsive to the OP and MR_STATUS signals.

Although for a prefetch operation the selector 42 preferably directs the PD_ADD signal to the prefetch memory 44, it is understood that the selector 42 could be implemented to support, under certain circumstances, directing such signal to the memory resources via the multiplexor 48. As an example, direction to the memory resources 40 may be supported when the prefetch memory 44 is empty and the memory resources 40 are available immediately to service the prefetch operation of the PD_ADD signal.

As another example, this direction to the memory resources 40 may be supported so as to test whether the information associated with the prefetch is already present in the memory resources 40. If there is a hit, the cache control 46 is so directed via the MR_STATUS signal and the selector 42, under the control of the cache control 46, discards the latched address. If the MR_STATUS signal indicates a miss, the selector 42, under the control of the cache control 46, directs the PD_ADD signal to the prefetch memory 44, as previously described.

In another example, the operations of the above two examples can both be supported. In one implementation, the PD_ADD signal is directed to the memory resources 40 for the test and, if the test indicates a miss, the prefetch commences.

It is also to be understood that, even if the direction to the memory resources 40 is supported under certain circumstances, such direction preferably is additional to direction of the PD_ADD to the prefetch memory 44. As previously described, the PD_ADD signal can be first directed to the memory resources 40 and, subsequently, to the prefetch memory 44, e.g., after determining that the information associated with the signal is absent from the memory resources 40. Moreover, the PD_ADD signal can be directed to the prefetch memory 44 at other times relative to the direction to the memory resources 40: e.g., concurrently or in advance. In all such cases, it is preferred to provide that the PD_ADD signal be discardable from the prefetch memory 44 via direct access thereto, and that such discard be implemented so as not to leave a hole in the prefetch memory's queue and otherwise not to disturb the other contents of the prefetch memory 44. Such discarding is contemplated, among other things, in the event that the memory resources 40 determine that the information associated with the signal is present in the memory resources 40 and/or if the processing device 12 proceeds to complete the operations associated with the particular prefetch PD_ADD signal.

The selector 42 preferably is implemented as a demultiplexor, with the cache control 46 controlling the direction of the PD_ADD signal. However, the selector 42 can be implemented otherwise in order to support particular features. As an example, the selector 42 can be implemented in combinational logic other than as a demultiplexor in order to direct the PD_ADD signal to both the prefetch memory 44 and the multiplexor 48 concurrently, as described above.

The prefetch memory 44 is coupled to the multiplexor 48. The prefetch memory 44 stores prefetch addresses to a selected depth in a selected structure. Preferably, the prefetch memory 44 is implemented to support a depth of up to sixteen address and to have a queue structure.

The prefetch memory 44 preferably is implemented to support testing of incoming addresses as to whether the information associated with the address is already present in the memory resources 40 ("issue screening"). If there is a hit, the cache control 46 is so directed via the MR_STATUS signal and the prefetch memory 44, under the control of the cache control 46, discards the latched address. If the MR_STATUS signal indicates a miss, the prefetch memory 44, under the control of the cache control 46, stores the address at the back of the queue. (If the prefetching cache memory 38 is implemented to support issue screening prior to the prefetch memory's receipt of addresses via the PF_ADD from the selector 42, it is preferred that issue screening is not also performed at the prefetch memory.)

The prefetch memory 44 preferably is implemented so as to test, as to each address at the front of the queue (e.g., at or just prior to injection), whether the information associated with the address is present in the memory resources 40. If there is a hit, the cache control 46 is so directed via the MR_STATUS signal and, under the control of the cache control 46, the prefetch memory 44 discards the address ("injection screening"). If there is a miss, the prefetch memory 44, again under the control of the cache control 46, directs the address in the form of a ADD_INPUT signal to the memory resources 40 for prefetching of the associated information.

The prefetch memory 44, in one embodiment, is contemplated to support ongoing screening of its contents. As an example, the prefetch memory 44 preferably supports discarding of prefetch addresses that become present in the memory resources 40 (e.g., due to cache access operations, such as content updates due to replacement policies) during the pendency of the prefetch addresses in the prefetch memory 44. As another example, the prefetch memory 44 preferably supports discarding of prefetch addresses that are associated with operations executed by the processing device 12 prior to the address's injection from the prefetch memory 44 (e.g., comparing addresses of cache access operations to the addresses held in prefetch memory 44, such as by employing a fully associative prefetch memory 44).

The prefetch memory 44, in another embodiment, is contemplated to maintain its contents without supporting the above-described, ongoing screening. This embodiment provides for prefetching information even if that information was temporarily present in the memory resource at some time while the address was stored in the prefetch memory 44 (e.g., the information was fetched as part of a cache access operation but then removed due to replacement under action of a least-recently-used replacement policy). However, it is preferred that, if the processing device 12 has completed the operations associated with the prefetch, that the address of the prefetch be discarded rather than injected.

While issue, ongoing and injection screening may all be implemented in any embodiment, it is understood that any one or all, or any combination, of these screenings may be omitted, without departing from the principles of the invention.

The prefetch memory 44 preferably is implemented to discard issued addresses received when the memory 44 is full. The discard, in this case, preferably is triggered by receipt of a subsequent address via the PD_ADD signal. Such implementation anticipates that space may become free in the prefetch memory 44 prior to discard, such that the address is directed to memory 44 rather than being discarded. Free space may arise, for example, as a result of ongoing screening operations.

The multiplexor 48 is coupled to the selector 42 and to the prefetch memory 44 so as to receive, respectively, the SELECT_ADD and the PF_ADD signals. The multiplexor 48, under the control of the cache control 46, selects between these two signals in directing the ADD_INPUT signal to the memory resources 40.

The memory resources 40 are configured, among other things, for storing information duplicated from the high level memory 18, as well as the associated address tags. The information preferably comprises data. However, it is understood that the information may comprise instructions and data/instructions, without departing from the principles of the invention. The information is received in the memory resources 40 from the processing device 12 and the high level memory 18 via, respectively, couplings 60 and 62.

Figure 3:
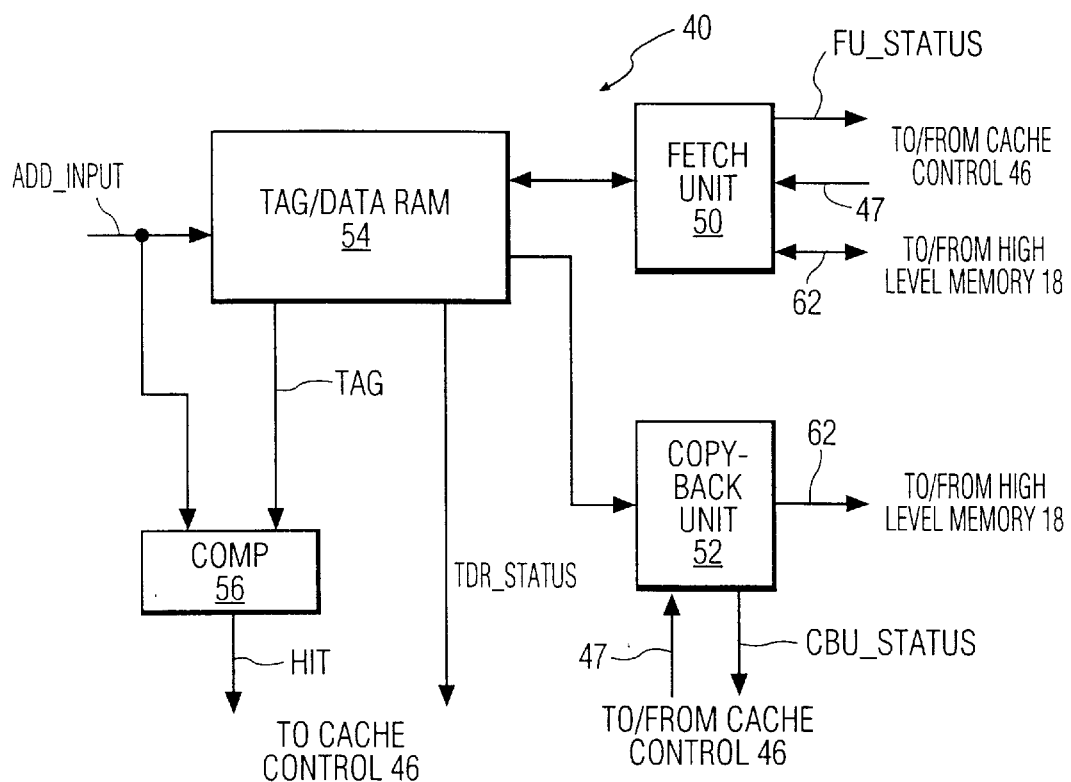
FIG. 3 illustrates, in additional detail, a portion of the prefetching cache memory of FIG. 2.

As shown in FIG. 3, the memory resources 40 preferably comprise a fetch unit 50, a copy-back unit 52, a tag/data RAM 54 and a comparator 56. The tag/data RAM 54 receives the ADD_INPUT signal comprising address information selected by the multiplexor 48 (i.e., either the SELECT_ADD signal for cache access operations or the PF_ADD signal for queued prefetch operations). Responsive to the ADD_INPUT signal, the tag/data RAM 54 outputs the TAG signal, such signal comprising one or more tags associated with stored information. The TAG signal is provided to the comparator 56. The comparator 56 compares the TAG signal to the ADD_INPUT signal to generate a HIT signal, the HIT signal indicating whether there is a hit or a miss. The HIT signal, among other things, is applied to the cache control 46 as part of the MR_STATUS signal, so as to enable the control 46 to perform its control operations (e.g., indicating to the processing device 12 whether or not there is a hit, as well as controlling the prefetch and cache access operations, etc.).

The tag/data RAM 54 also provides to the cache control 46, as part of the MR_STATUS signal, a TDR_STATUS signal. The TDR_STATUS signal indicates the status of the RAM 54, including whether the tag/data RAM 54 is available to perform prefetch operations. A prefetch address preferably is not injected as a ADD_INPUT signal if the TDR_STATUS signal indicates that the RAM 54 is unavailable.

The copy-back unit 52 preferably is provided in the event that the prefetching cache memory 38 is implemented to support copy-back operations. The copy-back unit 52 buffers a modified cache block toward updating the associated block of high level memory 18, particularly when a cache miss occurs such that the modified cache block is to be replaced in the tag/data RAM 54. The copy-back unit 52 preferably comprises one or more buffers, each buffer sized to hold one cache block, and communicating with the high level memory via coupling 62. The copy-back unit 52 preferably is coupled to the cache control: receiving control signals via control lines 47 and providing status signals to the cache control 46 via a CBU_STATUS signal (the CBU_STATUS signal comprising part of the MR_STATUS signal).

The fetch unit 50 preferably is interposed between the tag/data RAM 54 and the high level memory 18 so as to execute prefetching as to the tag/data RAM 54. The fetch unit 50 communicates with the high level memory via coupling 62. The fetch unit 50 also is coupled to the cache control 46: receiving control signals via control lines 47 and providing status signals via a FU_STATUS signal. The FU_STATUS signal comprises part of the MR_STATUS signal, and indicates to the cache control 46 the status of the fetch unit 50, including whether the unit 50 is available to perform prefetch operations. An address preferably is not injected as an ADD_INPUT signal if the FU_STATUS signal indicates that the fetch unit 50 is unavailable. However, in the event that an injection occurs and no fetch unit 50 is available, the injected address preferably is discarded.

Although only one fetch unit 50 is shown, it is to be understood that preferably plural such units 50 are employed. With plural fetch units 50, it is preferred that one or more such fetch units 50 be dedicated to performing cache access operations, including those of cache miss handling. It is also understood that, with plural fetch units 50, one or more such units 50 be dedicated to prefetch operations. In one embodiment, four fetch units 50 are contemplated in which two of such units 50 are dedicated to cache access operations and two are available to handle, as needed, both cache access and prefetch operations.

Figure 4:
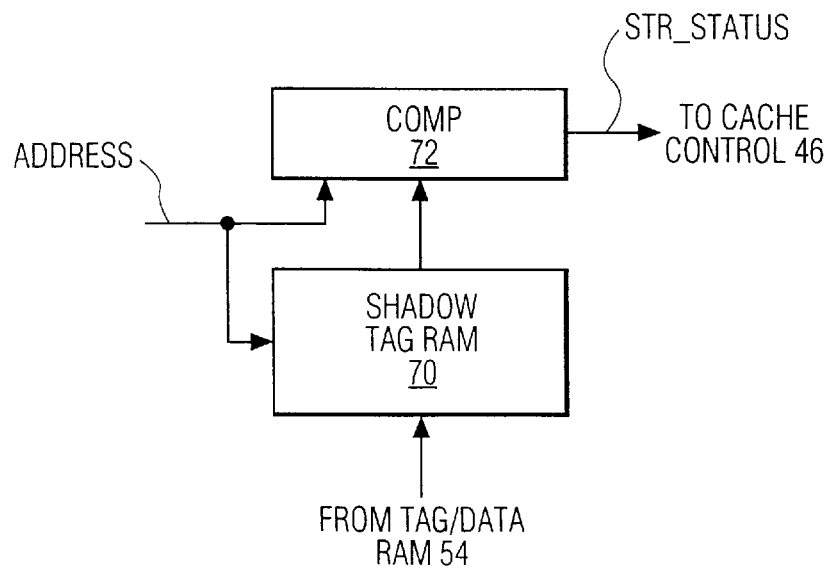
FIG. 4 illustrates, in additional detail, a portion of the prefetching cache memory of FIG. 2.

As shown in FIG. 4, an embodiment of a prefetching cache memory 38 contemplates employing a shadow tag RAM 70 and comparator 72 in connection with screening of addresses of prefetch instructions. The shadow tag RAM 70 is coupled (a) to the tag/data RAM 54 so as to receive updates regarding the tags stored therein and (b) to the cache control 46 so as to provide a status signal—STR_STATUS—indicating whether or not the information is present in the tag/data RAM 54. The shadow tag RAM 70 is also coupled, based on the type and source of screening, to receive addresses to be screened, such receipt being in the form of an ADDRESS signal. In issue screening, this coupling is to receive the PD_ADD signal: (i) directly from the processing device 12; or (ii) via the selector 42 as any of the PF_ADD, ADD_INPUT or SELECT_ADD signals; or (iii) to receive a signal from the prefetch memory 44 after the address is latched therein; or (iv) otherwise. In ongoing screening, this coupling is to receive addresses present in the prefetch memory 44, preferably by direct read therefrom. In injection screening, this coupling may be omitted in favor of using the tag/data RAM 54 and comparator 56. However, use of the shadow RAM 54 may be desirable if prefetched information is stored in preselected, restricted portions of the tag/data RAM 54 in that, in such case, the screening may be more efficient. (Indeed, such configuration also may be desirable in that it implicates a small-sized shadow RAM 70 and one that may enhance coordination with cache locking arrangements.)

The shadow tag RAM 70 and comparator 72 may be variously implemented. In one implementation, the shadow tag RAM 70 and comparator 72 are part of the memory resources 40, and the STR_STATUS signal provided from the comparator 72 comprises part of the MR_STATUS signal. It is to be recognized, however, that the RAM 70 and comparator 72 can be otherwise implemented, without departing from the principles of the invention.

Figure 5:
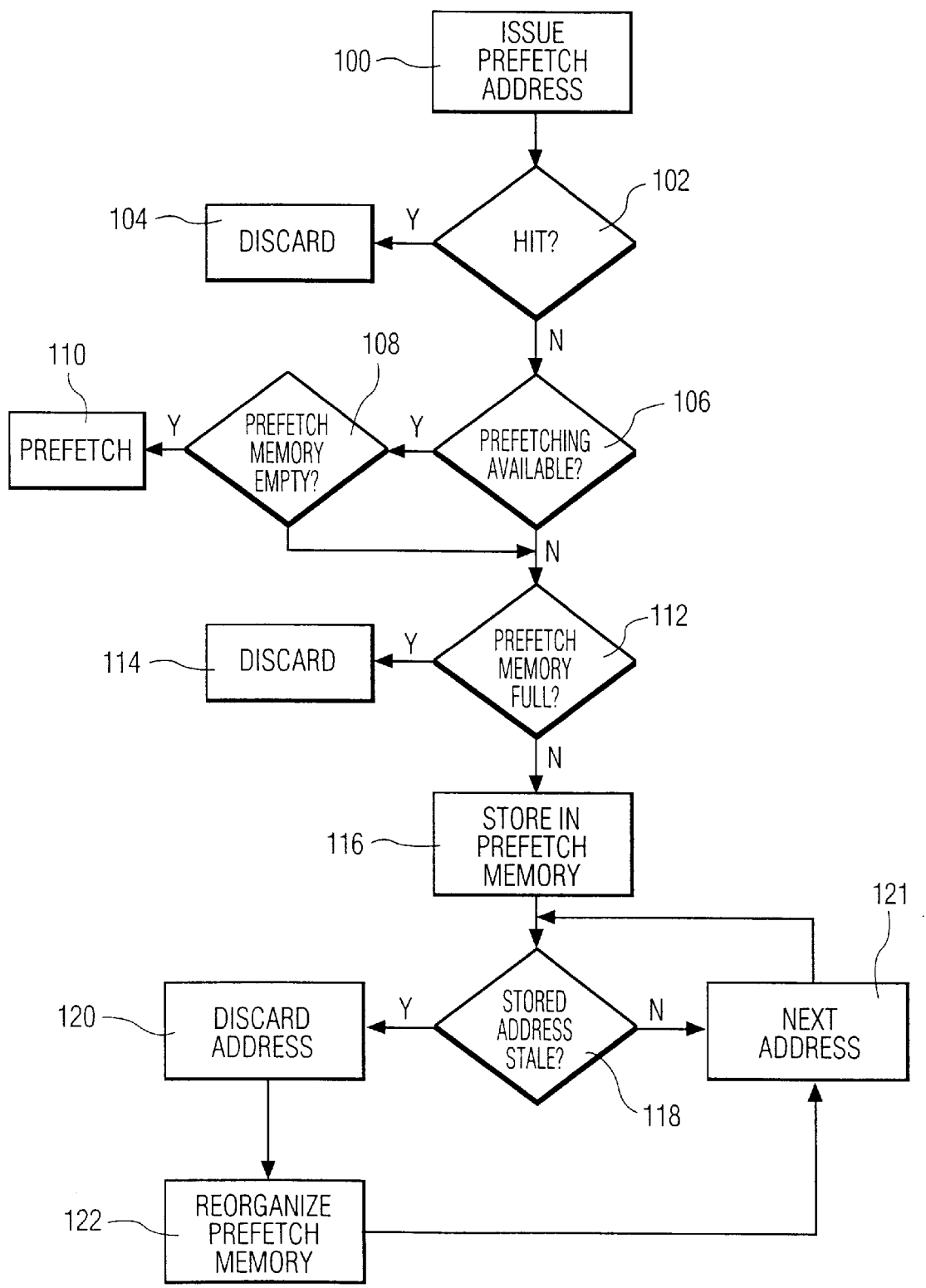
FIG. 5 is a flow-chart showing an embodiment of steps generally associated with issuing prefetch addresses, according to the present invention.
Figure 6:
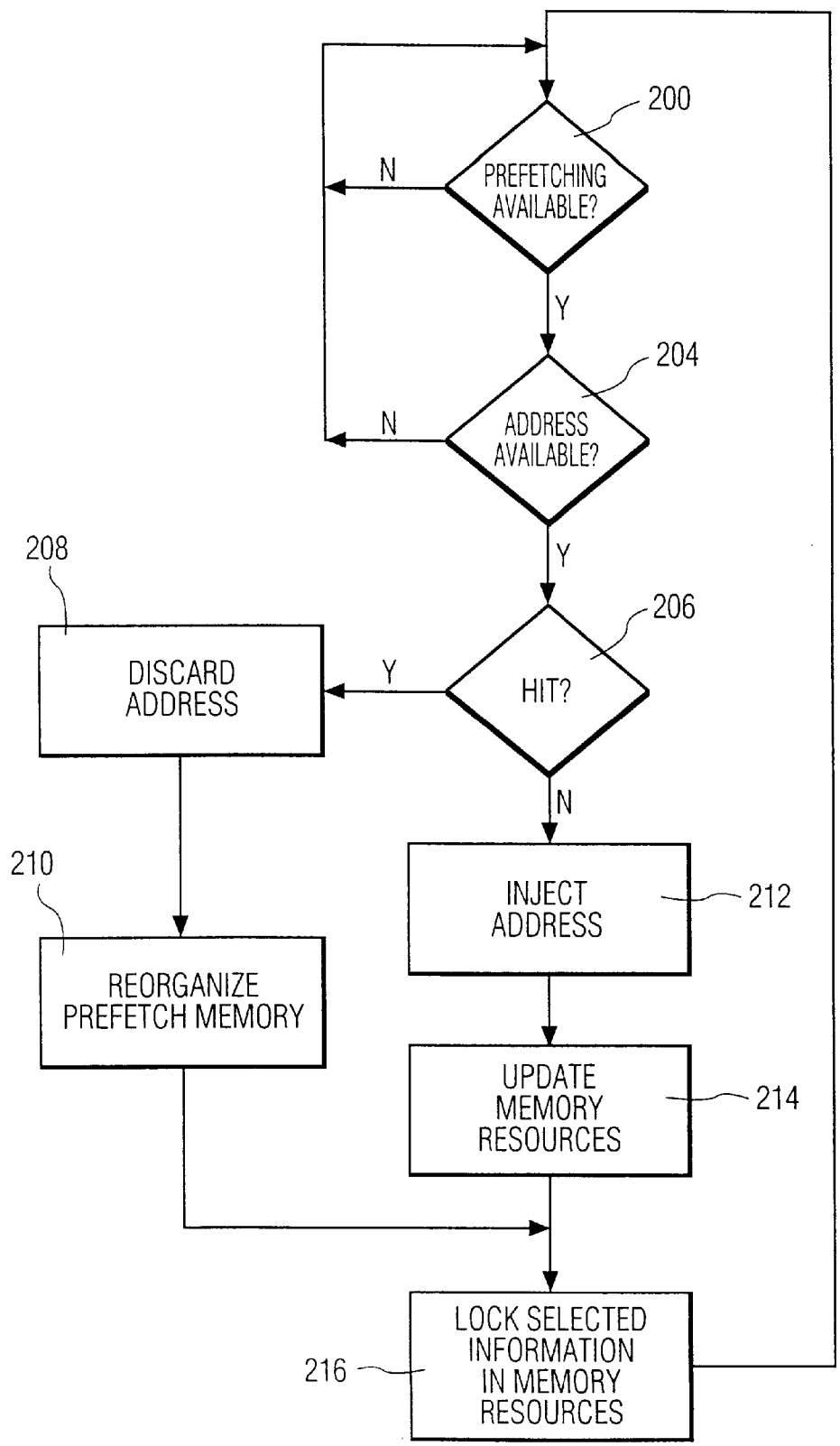
FIG. 6 is a flow-chart showing an embodiment of steps generally associated with injecting prefetch addresses, according to the present invention.

Turning to FIGS. 5 and 6, embodiments are shown of, respectively, issue and injection operations associated with prefetching, according to this invention. FIG. 5 illustrates that, upon issue of a prefetch instruction by the processing device 12 in step 100, the address of that instruction is screened in step 102 to determine whether the information associated with the address is present in the memory resources 40. If there is a hit, the address is discarded in step 104. In this step 104, it is preferred that measures be taken to enhance retention in the memory resources 40 of the information associated with the hit, such retention preferably extending until the time until the information is accessed by the processing device 12. If locking is available, it is preferred to provide for some or all of the information to be lockable. If locking is unavailable, it is preferred to provide for intercession as to any replacement policy's action as to the information. As an example, for a policy that replaces least recently used information, it is preferred to update the policy so as to mark as most recently used the information of the prefetch instruction.

If there is a miss in step 102, it is determined in step 106 whether resources are available for immediate prefetching. To make that determination, for example, the status of the tag/data RAM 54 and the fetch unit 50 preferably are monitored. Such status is indicated, respectively, by the TDR_STATUS signal of the tag/data RAM 54 and the FU_STATUS signals of the fetch unit 50. If these signals indicate that both of the respective components are then available, operations proceed to step 108, wherein it is determined whether the prefetch memory 44 is empty. If the memory 44 is empty, prefetching as to the instant address commences in step 110. As previously described, however, the issue process may omit steps 106, 108, and 110, without departing from the principles of the invention.

If the prefetch memory 44 is not empty or if either the tag/data RAM 54 or the fetch unit 50 is not available, prefetching does not so commence. Instead, operations proceed to step 112, wherein it is determined whether the prefetch memory 44 is full. If the memory 44 is full, the address is discarded in step 114. If the memory 44 is not full, the address is stored in the prefetch memory 44, in step 116.

Steps 118-122 illustrate ongoing screening of stored addresses. In step 118, it is determined whether a stored address is stale, i.e., whether the information associated with the address has become present in the tag/data RAM 54 or whether the processing device 12 has executed the operations associated with the address. If the address is stale, in step 120, the address is discarded from the prefetch memory 44 and, in step 122, the prefetch memory 44 is reorganized so that the discard does not leave a hole in the memory 44. Thereafter, operation returns to step 118 to continue screening as to other stored addresses.

If the address is not stale, step 118 is repeated to determine whether other stored addresses are stale and, ultimately, to repeat the determination as to all addressed, and so on.

FIG. 6 illustrates operations associated with injecting an address from the prefetch memory 44. In step 200, it is determined whether resources are available for prefetching. To make that determination, for example, the status of the tag/data RAM 54 and the fetch unit 50 preferably are monitored. Such status is indicated, respectively, by the TDR_STATUS signal of the tag/data RAM 54 and the FU_STATUS signals of the fetch unit 50. Until these signals indicate that both of the respective components are available, operations do not proceed to other steps. Once both components become available, however, operations proceed to step 204, wherein it is determined whether the prefetch memory 44 contains an address for injection.

If no address is found in step 204, operations return to step 200. If an address is found, operations proceed to step 206 wherein it is determined whether the information associated with the address is present in the memory resources 40. If there is a hit, operation proceeds to step 208 wherein the address is discarded from the prefetch memory 44 and, in step 210, the prefetch memory 44 is reorganized so that the discard does not leave a hole in the memory 44. If there is a miss in step 206, operations proceed (i) to step 212, wherein the address is injected into the memory resources 40 and (ii) to step 214, wherein the memory resources 40 are updated. The updating comprises fetching the information associated with the address (e.g., activating the fetch unit 50). The updating typically further comprises other task, depending on the embodiment, including, for example, exercising the replacement policy (e.g., identifying the cache block for replacement and setting the fetched information as the most recently used) and, if copy-back operations are supported, copying modified cache blocks back into the high level memory 18.

If locking is supported, operations proceed to step 216 from both steps 210 and 214. Step 216 is identified as a decision block in that locking is subject to various implementations, including that all or some of the information of the prefetch may be subject to locking.

In any case, operations return to step 200.

The steps of FIGS. 5 and 6 can be performed in sequences other than as shown, without departing from the principles of the invention. As an example, steps within either or both FIG. 5 and 6 can be performed concurrently. As another example, steps of FIG. 5 and 6 can be coordinated: if an address arrives for storage at the same time that another address is ready for injection, it is preferred that the storage operation be completed with priority over the injection operation.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A cache memory, the cache memory supporting prefetch operations and cache access operations so as to store information duplicated from a high level memory for use by a processing device, the processing device issuing addresses, including prefetch addresses and cache access addresses, the cache memory comprising:

memory resources for storing information; and prefetch resources coupled to the memory resources and to the processing device for storage of prefetch addresses from the processing device and for injection management of the stored prefetch addresses so as to coordinate prefetch operations with cache access operations, wherein the prefetch resources include a prefetch memory, a selector and a multiplexor, the prefetch memory providing for storing prefetch addresses, the selector being coupled to the prefetch memory and to the memory resources, the selector directing prefetch addresses to the prefetch memory and directing cache access addresses to the memory resources, and the multiplexor being coupled to the selector, to the prefetch memory and to the memory resources, and the multiplexor directing to the memory resources selected prefetch and cache access addresses received from the prefetch memory and the selector.

2. A cache memory as claimed in claim 1, further comprising a cache control, the cache control coupled to the processing device, to the memory resources and to the prefetch resources, the cache control receiving from the processing device a first signal distinguishing the prefetch addresses from the cache access addresses, and the cache control controlling prefetch and cache access operations responsive to said first signal.

3. A cache memory as claimed in claim 2, wherein the cache control receives from the memory resources a second signal indicating the availability of the memory resources for prefetching information in connection with prefetch addresses.

4. A cache memory as claimed in claim 3, wherein said second signal indicates to the cache control whether the information of a prefetch address is present in the memory resources.

5. A cache memory as claimed in claim 1, wherein the selector directs selected prefetch addresses to the memory resources.

6. A cache memory as claimed in claim 1, wherein the selector supports issue screening of prefetch addresses.

7. A cache memory as claimed in claim 1, wherein the prefetch resources support at least one of issue screening, on-going screening and injection screening.

8. A cache memory as claimed in claim 7, wherein the prefetch memory provides for discarding of prefetch addresses responsive to screening.

9. A cache memory as claimed in claim 7, further comprising a shadow tag RAM duplicating portions of the memory resources associated with storage of tags for prefetch operations.

10. A cache memory as claimed in claim 1, wherein the prefetch memory is a queue of selected depth.

11. A cache memory as claimed in claim 1, further comprising a fetch unit, the fetch unit coupled to the memory resources and the prefetch resources, so as to fetch information for storage in the memory resources in connection with at least one of prefetch and cache access addresses.

12. A cache memory as claimed in claim 11, further comprising plural fetch units, at least one of such plural units being dedicated to one of prefetch operations or cache access operations.

* * * * *